US012554151B2

(12) United States Patent
Tornéus

(10) Patent No.: US 12,554,151 B2
(45) Date of Patent: Feb. 17, 2026

(54) EYE TRACKING GLASSES

(71) Applicant: TOBII AB, Danderyd (SE)

(72) Inventor: Daniel Johansson Tornéus, Danderyd (SE)

(73) Assignee: Tobii AB, Danderyd (SE)

(*) Notice: Subject to any disclaimer, the term of this patent is extended or adjusted under 35 U.S.C. 154(b) by 0 days.

(21) Appl. No.: 18/591,041

(22) Filed: Feb. 29, 2024

(65) Prior Publication Data

US 2024/0295759 A1    Sep. 5, 2024

(30) Foreign Application Priority Data

Mar. 2, 2023    (SE) .................................... 2350237-0

(51) Int. Cl.
*G02C 11/00*    (2006.01)
*G02B 27/01*    (2006.01)
(Continued)

(52) U.S. Cl.
CPC ................ *G02C 11/10* (2013.01); *G02C 5/22* (2013.01); *G06F 3/013* (2013.01); *H04N 23/56* (2023.01);
(Continued)

(58) Field of Classification Search
CPC .......... G02C 11/10; G02C 11/04; G02C 5/22; G02C 5/14; G02C 5/00; G06F 3/013;
(Continued)

(56) References Cited

U.S. PATENT DOCUMENTS 9,041,787 B2    5/2015    Andersson et al.
9,727,790 B1    8/2017    Vaziri
(Continued)

FOREIGN PATENT DOCUMENTS

EP    3582077 A1    12/2019
WO    2015034561 A1    3/2015

OTHER PUBLICATIONS

Swedish Search Report for Application No. 2350237-0, completed on Nov. 23, 2023.
(Continued)

*Primary Examiner* — David Tung
(74) *Attorney, Agent, or Firm* — Christopher Ignatius Moylan

(57) ABSTRACT

A pair of eye tracking glasses comprising unitary components, which each include: a lens region, through which an eye of a user can look when they are wearing the glasses; and a carrier region, which is at the periphery of the first lens region. Unitary components comprise the following embedded therein: a camera; a plurality of illuminators; and electrical conductors. The glasses further comprise: a first arm that is mechanically connected to the first carrier region of the first unitary component; a second arm that is mechanically connected to the second carrier region of the second unitary component; and a control module. The control module is configured to: receive signalling from the camera of each of the unitary components via the embedded electrical conductors; and provide signalling to the plurality of illuminators of each of the unitary components via the embedded electrical conductors.

12 Claims, 4 Drawing Sheets

(51) Int. Cl.
*G02C 5/22* (2006.01)
*G06F 3/01* (2006.01)
*G09G 3/00* (2006.01)
*H04N 23/56* (2023.01)
*H04N 23/74* (2023.01)

(52) U.S. Cl.
CPC ..... *H04N 23/74* (2023.01); *G02B 2027/0138* (2013.01); *G02B 2027/014* (2013.01); *G02B 27/0172* (2013.01); *G02B 2027/0178* (2013.01); *G02B 2027/0187* (2013.01); *G09G 3/001* (2013.01)

(58) Field of Classification Search
CPC ...... G06F 3/0304; H04N 23/56; H04N 23/74; G02B 27/0172; G02B 27/0093; G02B 27/017; G02B 27/0176; G02B 27/01; G02B 2027/0138; G02B 2027/0178; G02B 2027/0187; G09G 3/001; G06V 40/197

See application file for complete search history.

(56) References Cited

U.S. PATENT DOCUMENTS

| | | | |
|---|---|---|---|
| 10,725,302 B1 | 7/2020 | Sharma et al. | |
| 10,852,817 B1 | 12/2020 | Ouderkirk et al. | |
| 11,520,152 B1 | 12/2022 | Lau et al. | |
| 12,174,379 B2 * | 12/2024 | Heger | G06F 1/163 |
| 2010/0110368 A1 * | 5/2010 | Chaum | G02C 11/10 351/158 |
| 2012/0127420 A1 * | 5/2012 | Blum | G02C 5/146 351/113 |
| 2013/0114850 A1 * | 5/2013 | Publicover | A61B 3/0025 382/103 |
| 2014/0055747 A1 * | 2/2014 | Nistico | A61B 3/14 351/246 |
| 2015/0062323 A1 * | 3/2015 | Gustafsson | H04R 1/32 348/78 |
| 2016/0342835 A1 * | 11/2016 | Kaehler | G06V 40/19 |
| 2017/0082858 A1 | 3/2017 | Klug et al. | |
| 2017/0115742 A1 | 4/2017 | Xing et al. | |
| 2017/0255011 A1 * | 9/2017 | Son | G02B 5/3025 |
| 2018/0203232 A1 * | 7/2018 | Bouchier | G02C 7/083 |
| 2020/0379214 A1 * | 12/2020 | Lee | G02B 27/0179 |
| 2021/0178639 A1 * | 6/2021 | Lukacs | A61C 13/0027 |
| 2022/0299794 A1 | 9/2022 | Ryner et al. | |
| 2023/0259205 A1 * | 8/2023 | Song | G06V 40/18 345/156 |

OTHER PUBLICATIONS

European Search Report for Application No. 24 15 9279, completed on Jul. 10, 2024.

* cited by examiner

Standard camera

Tilt shift – offset sensor area

Tilt shift – offset lens stack

EYE TRACKING GLASSES

CROSS-REFERENCE TO RELATED APPLICATION

The present application claims priority to Swedish patent application No. 2350237-0, filed 2 Mar. 2023, entitled "Eye Tracking Glasses," and is hereby incorporated by reference in its entirety.

FIELD

The present disclosure generally relates to the field of eye tracking. In particular, the present disclosure relates to pairs of eye tracking glasses that include an optical system.

BACKGROUND

In eye tracking applications, digital images are retrieved of the eyes of a user and the digital images are analysed in order to estimate gaze direction of the user. The estimation of the gaze direction may be based on computer-based image analysis of features of the imaged eye. One known example method of eye tracking includes the use of infrared light and an image sensor. The infrared light is directed towards eye(s) of a user and the reflection of the light is captured by an image sensor.

Portable or wearable eye tracking devices have been previously described. One such eye tracking system is described in U.S. Pat. No. 9,041,787 and PCT patent publication number WO 2019/158709 (which are hereby incorporated by reference in their entirety). A wearable eye tracking device is described using illuminators and cameras for determining gaze direction.

SUMMARY

According to a first aspect of the disclosure, there is provided a pair of eye tracking glasses comprising:
a first unitary component that comprises:
  a first lens region, through which a first eye of a user can look when they are wearing the glasses; and
  a first carrier region, which is at the periphery of the first lens region;
a second unitary component, which is mechanically connected to the first unitary component, wherein the second unitary component comprises:
  a second lens region, through which a second eye of the user can look when they are wearing the glasses; and
  a second carrier region, which is at the periphery of the second lens region;
wherein each of the first unitary component and the second unitary component comprises the following embedded therein:
  a camera;
  a plurality of illuminators; and
  electrical conductors;
wherein the pair of eye tracking glasses further comprises:
  a first arm that is mechanically connected to the first carrier region of the first unitary component;
  a second arm that is mechanically connected to the second carrier region of the second unitary component; and
  a control module that is configured to:
    receive signalling from the camera of each of the unitary components via the embedded electrical conductors; and
    provide signalling to the plurality of illuminators of each of the unitary components via the embedded electrical conductors.

Advantageously, such a pair of eye tracking glasses is strong and lightweight. Furthermore, it can require a low number of mounting steps such that assembly of the glasses is easier.

The first unitary component and the second unitary component can be provided together as a single unitary part.

At least some of the electrical conductors can be in the carrier regions of the unitary components.

The first arm can be mechanically connected directly to the first carrier region of the first unitary component by a first hinge. The second arm can be mechanically connected directly to the second carrier region of the second unitary component by a second hinge.

The first carrier region of the first unitary component can include a first hinge mounting recess. The second carrier region of the second unitary component can include a second hinge mounting recess. The first hinge can be provided in the first hinge mounting recess. The second hinge can be provided in the second hinge mounting recess.

One or both of the first and second carrier regions of the unitary components can further comprise an external camera mounting recesses for mounting an external camera.

One or both of the carrier regions of the unitary components can further comprise a microphone mounting recess for mounting a microphone.

The pair of eye tracking glasses may further comprise a display embedded in each of the lens regions of the unitary components for providing augmented reality functionality.

The pair of eye tracking glasses may further comprise: a holographic mirror embedded in each of the lens regions of the unitary components for providing augmented reality functionality; and a projector configured to project images onto the holographic mirror.

The lens regions of the unitary components may comprise tunable liquid crystal lenses. The control module may be configured to: process images captured by the cameras embedded in the unitary components in order to determine a gaze direction of the user's eyes and/or a convergence distance; and tune the refractive index of different regions of the tunable liquid crystal lenses based on the determined gaze direction and/or the determined convergence distance.

One of the arms may comprise: the control module located therein; an arm electrical connector; an arm electrical conductor embedded therein, which provides an electrical connection between the control module and the arm electrical connector. One of the unitary components may comprise a unitary component electrical connector, which is: i) electrically connected to the unitary component electrical conductor that is embedded in the unitary component; and ii) electrically connected to the arm electrical connector; such that electrical signalling can be communicated between the control module and the camera and the plurality of illuminators that are embedded in the unitary component.

The first and second unitary components may be moulded components.

The first and second unitary components may comprise a UV cured material.

The pair of eye tracking glasses may further comprise: a first carrier film, which is embedded in the first unitary component, and wherein the camera, the plurality of illuminators and the electrical conductors of the first unitary component are mounted on the first carrier film; and a second carrier film, which is embedded in the second unitary component, and wherein the camera, the plurality of illuminators and the electrical conductors of the second unitary component are mounted on the second carrier film.

The camera and/or the plurality of illuminators of each of first and second unitary components may be embedded in the lens regions of the respective unitary components.

The cameras embedded in the first and second unitary components may be tilt-shift cameras. Each camera can include a lens and a camera sensor. The centre of the lens of each camera can be laterally offset from the centre of the associated camera sensor.

According to a further aspect of the disclosure, there is provided a method of manufacturing a pair of eye tracking glasses, wherein the method comprises:

moulding a first unitary component, wherein the first unitary component comprises: i) a first lens region, through which a first eye of a user can look when they are wearing the glasses; and ii) a first carrier region, which is at the periphery of the first lens region; wherein this moulding step comprises embedding the following components in the first unitary component:
a camera;
a plurality of illuminators; and
electrical conductors;

moulding a second unitary component, wherein the second unitary component comprises: i) a second lens region, through which a second eye of the user can look when they are wearing the glasses; and ii) a second carrier region, which is at the periphery of the second lens region; wherein this moulding step comprises embedding the following components in the second unitary component:
a camera;
a plurality of illuminators; and
electrical conductors;

mechanically connecting a first arm to the first carrier region of the first unitary component;
mechanically connecting a second arm to the second carrier region of the second unitary component; and
providing a control module that is configured to:
receive signalling from the camera of each of the unitary components via the embedded electrical conductors; and
provide signalling to the plurality of illuminators of each of the unitary components via the embedded electrical conductors.

BRIEF DESCRIPTION OF THE DRAWINGS

One or more embodiments will now be described by way of example only with reference to the accompanying drawings in which.

DETAILED DESCRIPTION

Figure 1:
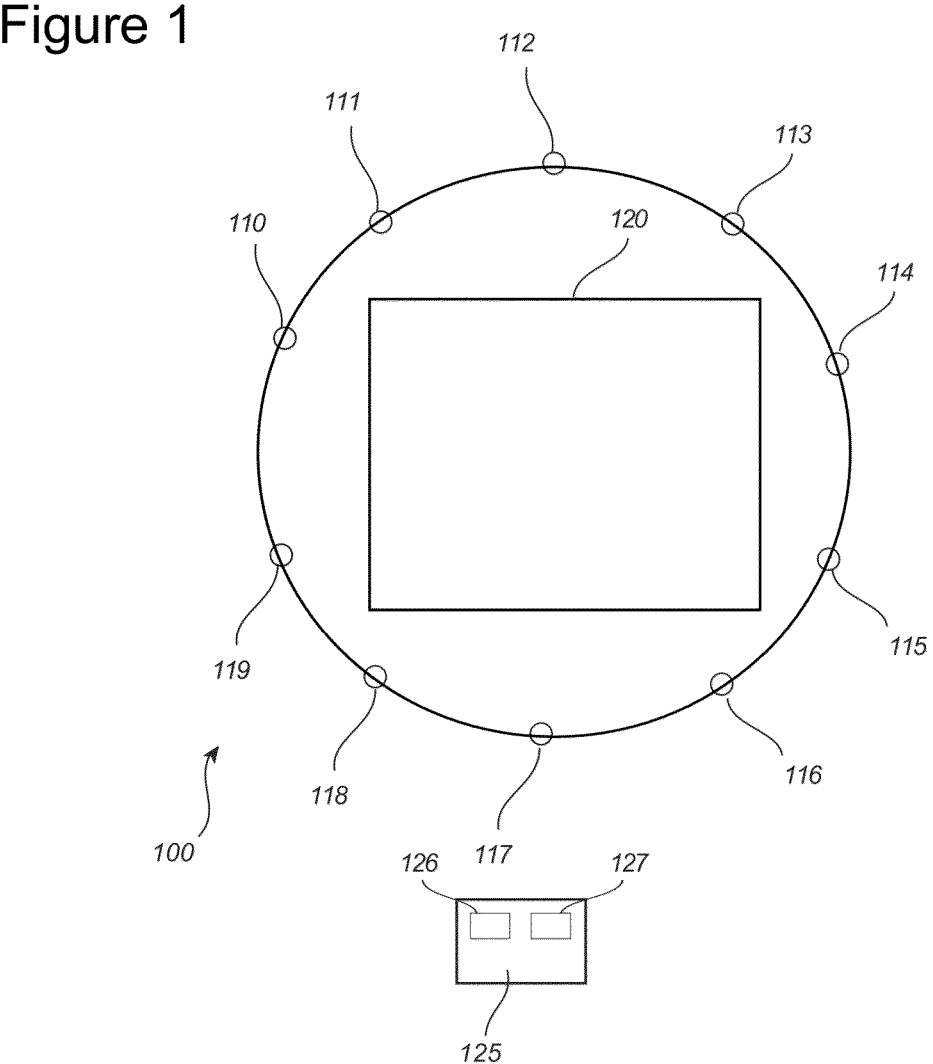
FIG. 1 shows a simplified view of an eye tracking system.

FIG. 1 shows a simplified view of an eye tracking system 100 (which may also be referred to as a gaze tracking system) in a head-mounted device in the form of a virtual or augmented reality (VR or AR) device or VR or AR glasses or anything related, such as extended reality (XR) or mixed reality (MR) headsets. The system 100 comprises a camera 120 for capturing images of the eyes of the user. The system may optionally include one or more illuminators 110-119 (which can also be referred to as light sources) for illuminating the eyes of a user, which may for example be light emitting diodes (LEDs) emitting light in the infrared frequency band, or in the near infrared frequency band and which may be physically arranged in a variety of configurations. The camera 120 may for example be an image sensor of any type, such as a complementary metal oxide semiconductor (CMOS) image sensor or a charged coupled device (CCD) image sensor. The camera may consist of an integrated circuit containing an array of pixel sensors, each pixel containing a photodetector and an active amplifier. The camera may be capable of converting light into digital signals. In one or more examples, it could be an infrared camera or IR camera, an RGB sensor, an RGBW sensor or an RGB or RGBW sensor with IR filter.

The eye tracking system 100 may comprise circuitry or one or more controllers 125, for example including a receiver 126 and processing circuitry 127, for receiving and processing the images captured by the camera 120. The circuitry may for example be connected to the camera 120 and the optional one or more illuminators 110-119 via a wired or a wireless connection and be co-located with the camera 120 and the one or more illuminators 110-119 or located at a distance, e.g., in a different device. In another example, the circuitry may be provided in one or more stacked layers below the light sensitive surface of the camera 120.

The eye tracking system 100 may include a display (not shown) for presenting information and/or visual stimuli to the user. The display may comprise a VR display which presents imagery and substantially blocks the user's view of the real-world or an AR display which presents imagery that is to be perceived as overlaid over the user's view of the real-world.

The location of the camera 120 for one eye in such a system 100 is generally away from the line of sight for the user in order not to obscure the display for that eye. This configuration may be, for example, enabled by means of so-called hot mirrors which reflect a portion of the light and allows the rest of the light to pass, e.g., infrared light is reflected, and visible light is allowed to pass.

In an eye tracking system, a gaze signal can be computed for each eye of the user (left and right). The quality of these gaze signals can be reduced by disturbances in the input images (such as image noise) and by incorrect algorithm behaviour (such as incorrect predictions). A goal of the eye tracking system is to deliver a gaze signal that is as good as possible, both in terms of accuracy (bias error) and precision (variance error). For many applications it can be sufficient to deliver only one gaze signal per time instance, rather than both the gaze of the left and right eyes individually. Further, the combined gaze signal can be provided in combination with the left and right signals. Such a gaze signal can be referred to as a combined gaze signal.

Figure 2:
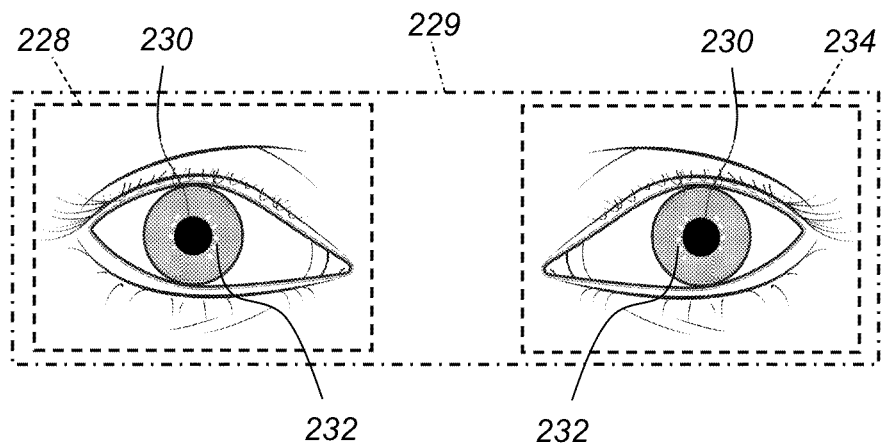
FIG. 2 shows a simplified example of an image of a pair of eyes, captured by an eye tracking system such as the system of FIG. 1.

FIG. 2 shows a simplified example of an image 229 of a pair of eyes, captured by an eye tracking system such as the system of FIG. 1. The image 229 can be considered as including a right-eye-image 228, of a person's right eye, and a left-eye-image 234, of the person's left eye. In this example the right-eye-image 228 and the left-eye-image 234 are both parts of a larger image of both of the person's eyes. In other examples, separate cameras may be used to acquire the right-eye-image 228 and the left-eye-image 234. In other examples, multiple cameras may be used to acquire images capturing both eyes.

The system may employ image processing (such as digital image processing) for extracting features in the image. The system may for example identify a position of the pupil 230 in the one or more images captured by the camera. The system may determine the position of the pupil 230 using a pupil detection process. The system may also identify corneal reflections 232 located in close proximity to the pupil 230. The system may estimate a corneal centre and/or a distance to the user's eye based on the corneal reflections 232. For example, the system may match each of the individual corneal reflections 232 for each eye with a corresponding illuminator and determine the corneal centre of each eye and/or the distance to the user's eye based on the matching. To a first approximation, the eye tracking system may determine an optical axis of the eye of the user as the vector passing through a centre of the pupil 230 and the corneal centre. The direction of gaze corresponds to the axis from the fovea of the eye through the centre of the pupil (visual axis). The angle between the optical axis and the gaze direction is the foveal offset, which typically varies from user to user and is in the range of a few degrees. The eye tracking system may perform a calibration procedure, instructing the user to gaze in a series of predetermined directions (e.g., via instructions on a screen), to determine the fovea offset. The determination of the optical axis described above is known to those skilled in the art and often referred to as pupil centre corneal reflection (PCCR). PCCR is not discussed in further detail here.

It is possible to mould the lenses of a pair of eye tracking glasses with components placed inside. This conveniently enables suitable placement of electronic components within the lenses, and can avoid the need for mechanical components to hold the electronic components in place. This is because the electronic components are hermetically sealed inside the moulded material of the lenses.

It has been found that placing these lenses in a frame, when assembling eye tracking glasses, causes issues. Especially, if the glasses are to have many kinds of sensors and functionality. For a pair of glasses to be light, strong, and robust the frame can be made with moulded solid plastics or metal. However, eye tracking and AR glasses require a variety of sensors, chips, microphones, etc. along with their mounting solutions (e.g., screws, brackets, adhesive, glue). Such eye tracking/AR glasses can also require flexible printed circuits (FPCs) or cables to connect these electronic components to the processing chips. This all means that the frames of the glasses should be hollow and also provided as two halves such that these components and FPCs can be mounted within the frames. In practice, these frames are often provided as two relatively thin halves that are mounted together. They can be mounted together with one or more of glue, screws and snap-fit components. This makes the assembly complicated and expensive and can also result in the frame being weak and not robust to being dropped.

One way to address these issues is to make everything thicker. But doing so adds significant weight and size glasses, which may not be acceptable for eye tracking/AR applications. Often, the weight of such glasses should be less than 100 grams, preferably less than 50 grams. This is not possible with the current way of making glasses.

Figure 3:
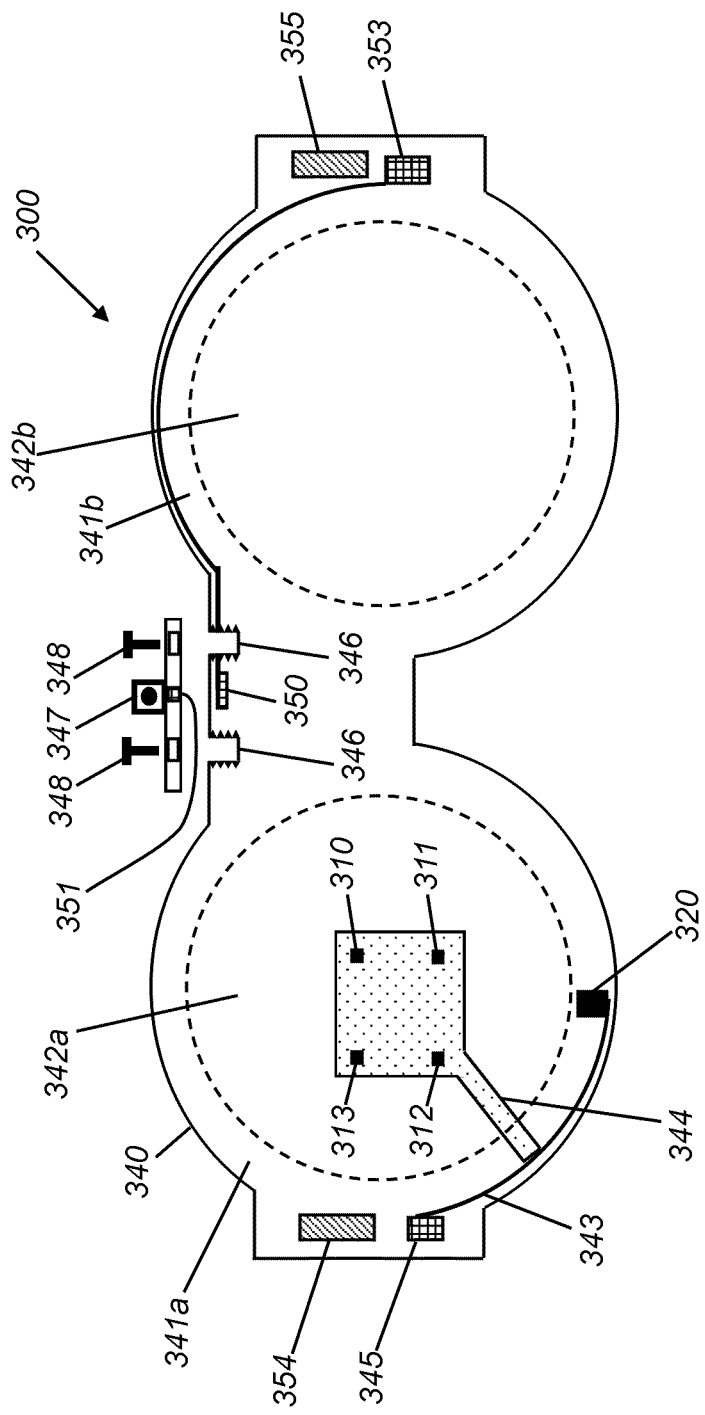
FIG. 3 shows an example embodiment of a unitary part of a pair of eye tracking glasses according to the present disclosure.

FIG. 3 shows an example embodiment of a unitary part 340 of a pair of eye tracking glasses 300 according to the present disclosure. As will be discussed in detail below, the unitary part 340 in this example includes two lens regions 342a, 342b of the glasses 300 along with what would usually be referred to as the frame of the glasses 300. Such a frame would usually be provided as a separate component that fits around the lenses and provides a mechanical coupling to the arms (which may also be referred to as side frames, but are not shown in FIG. 3). However, in the text that follows, we will refer to the outer regions of the unitary component 340 as carrier regions 341a, 341b. Since the carrier regions 341a, 341b are unitary with the lens regions 342a, 342b, we will not refer to them as the frame of the glasses in case that is considered to imply that they are provided as separate components to the lenses of the glasses 300 (which they are not).

The unitary part 340 that is shown in FIG. 3 includes: a first lens region 342a, through which a first eye of a user can look when they are wearing the glasses 300; and a second lens region 342b, through which a second eye of the user can look when they are wearing the glasses 300. The unitary part 340 also includes a first carrier region 341a, which is at the periphery of the first lens region 342a. In this way, the first lens region 342a can be considered as a central region with reference to the first carrier region 341a. The unitary part 340 also includes a second carrier region 341b, which is at the periphery of the second lens region 342b. Again, the second lens region 342b can be considered as a central region with reference to the second carrier region 341b. The boundaries between the first and second carrier regions 341a, 341b and their corresponding lens regions 342a, 342b are shown with dotted lines in FIG. 3. The first and second carrier regions 341a, 341b can extend around the entire periphery of their corresponding lens regions 342a, 342b and join up at the nose piece of the glasses 300, as shown schematically in FIG. 3. Alternatively, the first and second carrier regions 341a, 341b can extend around only part of the periphery of their corresponding lens regions 342a, 342b.

The unitary part 340 of FIG. 3 is a single monolithic piece that is provided by a single material (notwithstanding components that are embedded within, as will be discussed below). In this example, the unitary part 340 is a moulded component that is provided by a moulding operation. Therefore, each of the first carrier region 341a, the second carrier region 341b, the first lens region 342a and the second lens region 342b are made from the same material as part of a single moulding operation.

In another example, the unitary part 340 of FIG. 3 can be provided as two separate unitary components. A first unitary component can include the first carrier region 341a and the first lens region 342a. A second unitary component can include the second carrier region 341b and the second lens region 342b. In this way, a separate unitary component can be provided for each of the user's eyes. The two unitary components can then be mechanically connected together in any way that is known in the art, such as by gluing them together. In the same way as described above, each unitary component (that includes a lens region and a carrier region)

can be considered as a single monolithic piece that is provided by the same material, for example by a moulding operation.

For each of the eyes of the unitary part 340 of FIG. 3, the following components are embedded therein (although the components are only shown for one of the eyes for ease of illustration): a camera 320; a plurality of illuminators 310, 311, 312, 313; and electrical conductors 343, 344. The electrical conductors 343, 344 are for communicating electrical signals to and/or from the camera 320 and the plurality of illuminators 310-313. The electrical conductors 343, 344 can be implemented as flexible printed circuits (FPCs) or cables, for example. Each of these components 320, 311-313, 343, 344 can be embedded in the unitary part 340 as part of the moulding process. For example, an ultra-violet (UV) curable liquid can be delivered into a mould in which the components are located. Then, when the UV curable liquid is cured such that it becomes a solid, the components 320, 311-313, 343, 344 are embedded within the solid unitary part 340. It can be advantageous to use a UV curable liquid because the curing process does not require particularly high temperatures, which could otherwise damage the electronic components that are embedded in the moulding. An example method of manufacture of the glasses 300 will be described in detail with reference to FIG. 5.

The illuminators 310-313 are for illuminating the user's eye when they are wearing the glasses 300. As discussed above, and as known in the art, such illuminators 310-313 can be used to provide eye tracking functionality. In this example, four illuminators 310-313 are shown, although it will be appreciated that any suitable number of illuminators can be used in other examples. The illuminators 310-313 in this example are provided as LED (light emitting diode) integrated circuits, which can be 200 μm in size, or even smaller. Therefore, even though the illuminators 310-313 are located in the lens regions 342a, 342b of the unitary part 340, they do not significantly obscure the user's field of view.

The illuminators 310-313 are provided on a transparent FPC 344 in FIG. 3. This transparent FPC 344 is an implementation of one of the embedded electrical connectors, in that it can be used to selectively provide power to the illuminators 310-313. As can be seen in FIG. 3, the majority of the transparent FPC 344 is located within the lens region 342a of the unitary part 340 in order to provide an electrical connection to the illuminators 311-313. Being transparent, of course, the FPC 344 also does not significantly obscure the user's field of view. The transparent FPC 344 can have a base that is made of Polyethylene terephthalate (PET) or polyamide, for example. The electrical conductors of the transparent FPC 344 can be made of a transparent material such as indium tin oxide (ITO), or can be provided as very narrow leads, e.g., copper leads, such that they are not readily discernible to the user.

The transparent FPC 344 is galvanically connected to a periphery electrical connector 343, which extends around the carrier region 341a of the unitary part 340. In this example, the periphery electrical connector 343 is implemented as an FPC that is orientated such that it is in a plane that is perpendicular to the face of the lens regions 342a, 342b. In this way, it's narrow side (which may be only 100-200 μm) faces the eye side of the glasses and it is less visible to the user. Therefore, it is not too prominent in the user's field of view. Furthermore. it may not have to be implemented as a transparent FPC since it is not located in lens region 342a. Nonetheless, the periphery electrical conductor 343 can be placed as close to the peripheral edge of the unitary part 340 as possible. In this way, at least some of the electrical conductors are in a carrier region 341a, 341b of the unitary part 340.

Figure 4:
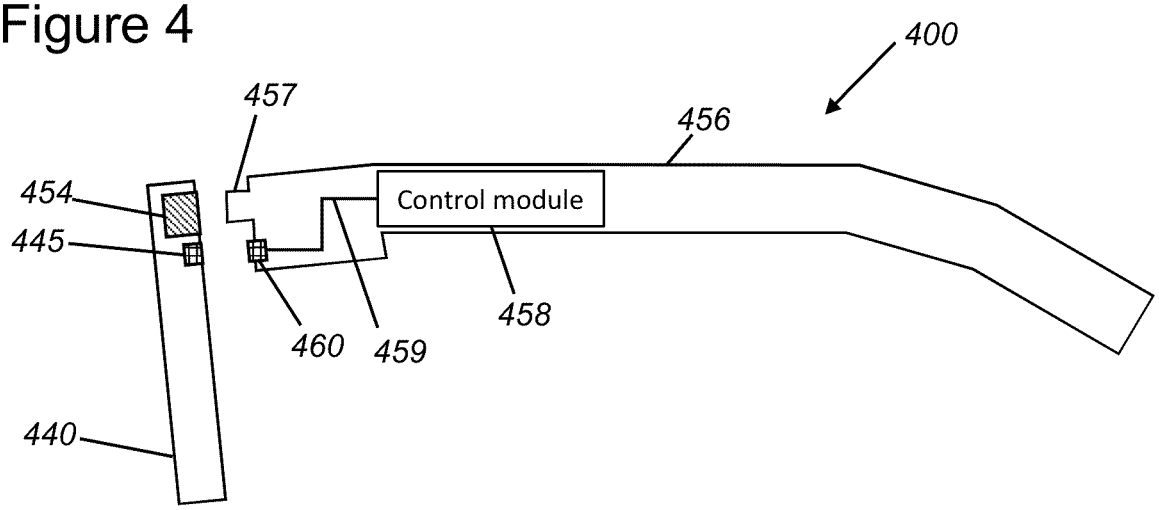
FIG. 4 shows an exploded side view of a pair of eye tracking glasses according to an embodiment of the present disclosure.

The periphery electrical conductor 343 provides an electrical connection between the transparent FPC 344 (and therefore also the illuminators 311-313) and a unitary component electrical connector 345. As will be discussed below, the unitary component electrical connector 345 is in the vicinity of one of the arms (not shown) of the glasses such that it can provide an electrical connection to a corresponding arm electrical connector (not shown in FIG. 3, but it is shown in FIG. 4) that is located in the arm of the glasses 300.

The periphery electrical conductor 343 also provides an electrical connection between the unitary component electrical connector 345 and the camera 320 that is embedded in the unitary part 340. The camera 320 can be embedded in the carrier region 341a of the unitary part 340 as shown in FIG. 3, or it can be embedded in the lens region 342a of the unitary part 340. It will be appreciated that the camera 320 does not have to be located in the specific region of the unitary part 340 as it is shown in FIG. 3 in order to be able to capture images of the user's eyes for eye tracking. Furthermore, advantageously the camera 320 can be provided as a tilt-shift camera as will be described in detail below with reference to FIG. 6b.

In the example of FIG. 3, both of the first and second carrier regions 341a, 341b of the unitary part 340 include an external camera mounting recess 346 for mounting an external camera 347. Such an external camera 347 can also be referred to as a scene camera when it is used to AR applications. In this example, the external camera mounting recesses 346 have screw inserts (that can be inserted after the unitary component 340 has been moulded) for receiving screws 348 that are used to secure the external camera 347 to the unitary component 340. In this example, the external camera 347 is provided on a mounting bracket. When the external camera 347 is attached to the unitary component 340, an electrical connector 351 that is associated with the external camera 347 is brought into electrical contact with an external camera electrical connector 350 that is associated with the unitary component 340. In turn, the external camera electrical connector 350 is electrically connected to a unitary component electrical connector 353. In this example, the external camera electrical connector 350 is connected to a unitary component electrical connector 353 that is different to the unitary component electrical connector 345 to which the embedded camera 320 and the illuminators 311-313 are connected. Although in other embodiments, each of these components can be connected to the same unitary component electrical connector 345, 353.

The first carrier region 341a of the unitary part 340 includes a first hinge mounting recess 354. A first hinge (not shown) is provided in the first hinge mounting recess 354. The second carrier region 341b of the unitary part 340 includes a second hinge mounting recess 355. A second hinge (not shown) is provided in the second hinge mounting recess 355. The first hinge mounting recess 354 is also shown in FIG. 4 with a corresponding reference number in the 400 series.

FIG. 4 shows an exploded side view of a pair of eye tracking glasses 400 according to an embodiment of the present disclosure. Shown in FIG. 4 is the unitary component 440 of FIG. 3, for which the first hinge mounting recess 454 and the unitary component electrical connector 445 are visible. Also shown in FIG. 4 is a first arm 456 of the glasses 400. It will be appreciated that the glasses 400 also have a second arm, which is not visible in FIG. 4.

A first hinge (not shown) is provided in the first hinge mounting recess 454. As can be appreciated from the exploded view FIG. 4, the first arm 456 of the glasses 400 is mechanically connected to the unitary part 440 by coupling an extension region 457 of the first arm 456 to the unitary part 440. More particularly, in this example the first arm 456 is mechanically connected directly to the first carrier region of the unitary part 440 by a first hinge (not shown).

Similarly, although not visible in FIG. 4, the second arm of the glasses can be mechanically connected directly to the second carrier region of the unitary part 440 by a second hinge.

The pair of eye tracking glasses 400 also includes a control module 458. In this example, as shown in FIG. 4, the control module 458 is located within the first arm 456. The specific location of the control module 458 is not important to the invention, and therefore it can be provided on or within any part of the glasses 400. Nonetheless, there is an advantage to providing it one or both of the arms in order to keep the front part of the glasses as small and light as possible.

The control module 458 can include a processor and a power supply, for example a battery. At least some of the functionality of the processor may be located remote from the eye tracking glasses, such that the control module 458 of the glasses 400 can communicate information (such as images of the user's eyes that are acquired by the embedded camera) to the remote processor for performing gaze tracking. Irrespective of where the majority of the gaze tracking processing is performed, the control module 458 can receive signalling from at least the cameras that are embedded in the unitary part via the electrical conductors that are embedded in the unitary part 440. The control module 458 can also provide electrical signalling to the plurality of illuminators of the unitary part 440 via the electrical conductors in the unitary part 440. As discussed above, the electrical conductors that are embedded in the unitary part 440 are electrically connected to the unitary component electrical connector 445. When the unitary part 440 is connected to the first arm 456, the unitary component electrical connector 445 connects with an arm electrical connector 460 that located on or in the first arm 456. The first arm 456 includes an arm electrical conductor 459 embedded therein, which provides an electrical connection between the control module 458 and the arm electrical connector 460. Therefore, the control module 458 can receive electrical signalling from, and transmit electrical signalling to, the components that are embedded within or connected to the unitary part 440.

In some examples, one or both of the carrier regions of the unitary part can also include a microphone mounting recess for mounting a microphone (not shown). The microphone is then in electrical communication with the control module 458 such that recorded sound signalling can be provided from the microphone to the control module 458 for subsequent processing. In another example, a microphone can be embedded within the unitary part 440 in the same way as the embedded camera and the illuminators.

Figure 5:
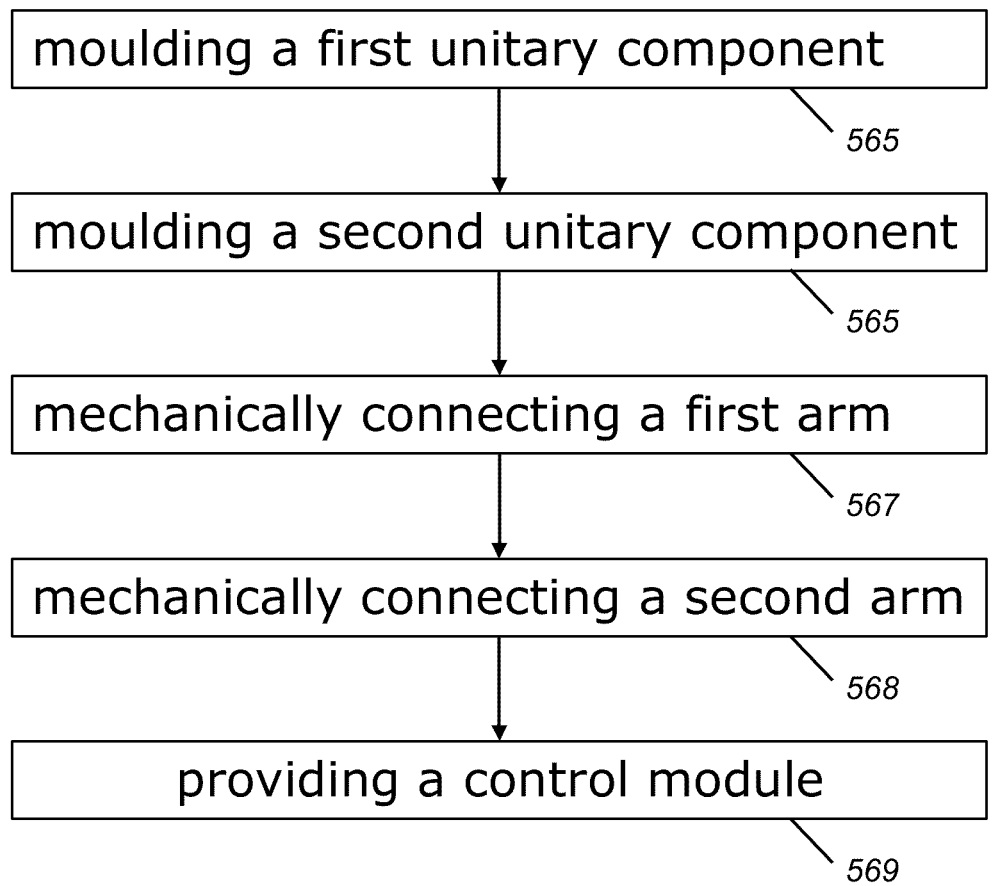
FIG. 5 schematically illustrates a method of manufacturing a pair of eye tracking glasses according to the present disclosure.

FIG. 5 schematically illustrates a method of manufacturing a pair of eye tracking glasses according to the present disclosure. The method of FIG. 5 relates to manufacturing a pair of eye tracking glasses in which two unitary components (one for each eye) are separately moulded. However, it will be appreciated from the description of FIG. 3 that in another embodiment the two unitary components can be provided as a single unitary part, by a single moulding step.

At step 564, the method includes the step of moulding a first unitary component. The first unitary component comprises: i) a first (central) lens region, through which a first eye of a user can look when they are wearing the glasses; and ii) a first carrier region, which is at the periphery of the first lens region.

This moulding step 564 includes embedding the following components in the first unitary component: a camera; a plurality of illuminators; and electrical conductors. Each of these components is described in detail with reference to FIG. 3. In one example, the camera, the plurality of illuminators and the electrical conductors for the first unitary component are mounted on a first carrier film before they are embedded in the first unitary component. The first carrier film can then be located in the mould before the liquid of the first unitary component is poured into the mould such that each of the components can be located in position before the liquid is cured. As indicated above, a UV curable liquid can be delivered into the mould in which the components are located. In which case, at least part of the mould is transparent to UV light.

At step 565, the method includes the step of moulding a second unitary component. The second unitary component comprises: i) a second (central) lens region, through which a second eye of the user can look when they are wearing the glasses; and ii) a second carrier region, which is at the periphery of the second lens region.

This moulding step 565 embedding the following components in the second unitary component: a camera; a plurality of illuminators; and electrical conductors. In a similar way to that described for the moulding of the first unitary component, the components for the second unitary component can be mounted on a second carrier film before they are embedded in the second unitary component.

Therefore, with this method the entire front mechanical part of the glasses (i.e., the lenses and what would usually be referred to as the frame of the glasses) can be moulded. Electronics (such as FPCs, cameras, microphones, etc.) and mechanical parts (such as hinges, screw mounts, or cosmetical parts) can either be moulded into the unitary components or subsequently mounted by glue or screws, for example.

Any parts of the eye tracking glasses that require access to the outer world, such as microphones or connectors, can be fully buried during the moulding but then exposed by drilling or milling out part of the unitary components. To make it easier and require less tolerance in the milling step, a hollow mechanical piece can be added around any ports that require access to the environment around the unitary component (such as a microphone port) so that the hollow mechanical piece can then be drilled into after moulding.

Benefits of glasses manufactured according to steps 564 and 565 includes them being stronger and lighter with fewer mounting steps (and therefore assembly is easier). Tolerances can be made better due to fewer mounting interfaces, which all add tolerances. Furthermore, overall stiffness can be increased due to the use of the unitary components. Which in turn, lessens the need for heavy stiffening with metal. Such stiffening may otherwise be needed when external cameras are fitted to the eye tracking glasses (for example, for room tracking cameras) that need to have a rigid mounting in relation to each other. The eye tracking glasses can also be much smaller and have a more advanced form factor since there is a reduced need for interfaces to mount several parts together.

Since the first and the second unitary components include lens regions, through which the user will look, they are moulded using a transparent material. If it is desirable for the carrier regions of the unitary components to not be transparent (for aesthetic reasons such that they more closely resemble a traditional frame), a coloured film can be placed in those regions when the unitary components are moulded, or an additional step can be taken after moulding to colour the carrier regions. For instance, the lens regions of the unitary components can be temporarily covered such that the carrier regions can be spray painted after they have been moulded.

Returning to the method of FIG. 5, it continues with step 567 that includes mechanically connecting a first arm to the first carrier region of the first unitary component. Similarly, at step 568, the method includes mechanically connecting a second arm to the second carrier region of the second unitary component. As discussed above, the entire front region of the eye tracking glasses can be moulded as one or more unitary parts/components (each of which includes at least lens region and at least one carrier region at the periphery of the lens region). As shown in FIG. 3, holes/recesses can be left at each side where hinges for the arms can be glued into place. Therefore, steps 567 and 568 of FIG. 5 can involve directly connecting the arms to the unitary components using hinges that are located in respective recesses in the unitary components.

Finally, at step 569 of FIG. 5, the method includes providing a control module (that can include a processor and a power supply). As discussed above, the control module is configured to: receive signalling from the camera of each of the unitary components via the embedded electrical conductors; and provide signalling to the plurality of illuminators of each of the unitary components via the embedded electrical conductors.

The control module can be located anywhere in or on the eye tracking glasses. In an example, where it is implemented in one or both of the arms, the steps of mechanically connecting one or both of the arms to the unitary components can also include electrically connecting the control module to the electronic components that are embedded in the unitary components. For the example of FIGS. 3 and 4, this includes electrically connecting together a unitary component electrical connector 445 of the unitary component with an arm electrical connector 460 of the arm.

Any of the pairs of eye tracking glasses that are described herein can also include components to enable them to be used for augmented reality (AR) applications. For example, they can include a display, optionally a liquid crystal display, that is embedded in one or both of the lens regions of the unitary components for providing augmented reality (AR) functionality. Alternatively, they can include a holographic mirror embedded in each of the lens regions of the unitary components along with a projector that is configured to project images onto the holographic mirror. Such a projector can be located on one or both of the arms, for example. As a further example, a waveguide can be moulded inside the lens regions. An out-coupling part of the waveguide can be in the middle of the lens region in front of the eye (for example, in the same position as the transparent FPC 344 in FIG. 3). The waveguides would then have an in-coupling region where a display/optical module would be coupled in. This could be on the outside of the lens region, for example near or as part of the unitary component electrical connector 345.

As another example, any of the pairs of eye tracking glasses that are described herein can also include components to enable them to be used as presbyopia glasses. In which case, the lens regions of the unitary components can comprise tunable liquid crystal lenses. The control module can then process images captured by the cameras embedded in the unitary components in order to determine a gaze direction of the user's eyes; and tune the refractive index of different regions of the tunable liquid crystal lenses based on the determined gaze direction. Alternatively or additionally, the control module can process images captured by the cameras embedded in the unitary components in order to determine a convergence distance of the user's eyes; and tune the refractive index of different regions of the tunable liquid crystal lenses based on the determined convergence distance. As is known in the art, the convergence distance (also known as gaze convergence distance) can be defined as the distance between a system origin (such as an origin of a VR or an AR headset) and the intersection of gaze rays from user's left and right eyes.

The teachings of the present disclosure can be used to provide a pair of AR glasses that look like normal glasses. Inside the moulded parts there can be provided eye-tracking cameras, LEDs, and FPCs going to at least one of the hinges. The connectors can then be milled out and have another FPC in the hinge connected to it. Cameras for room tracking can be added via gluing to mechanical recesses in the unitary part and connected to FPC connectors that are also milled out. These FPCs are then connected to the same FPC from the eye-tracking camera and LEDs.

As shown in FIG. 3, the cameras in the eye tracking glasses are placed at the periphery of the glasses. However, the cameras should be able to view the eye. Assuming that the cameras have a limited field of view, which is often the case, this can be achieved by significantly tilting the camera towards the eye. This tilting can be performed by having a robot or human tilting the camera after it has been mounted on its film carrier, and then requiring another robot or human to fix the camera in position by glue, for example. This significantly increases cost due to its complexity. It also limits the applicability of moulding eye-tracker cameras into lenses due to being too expensive for mass volumes that are sought for AR or VR products.

Figure 6A:
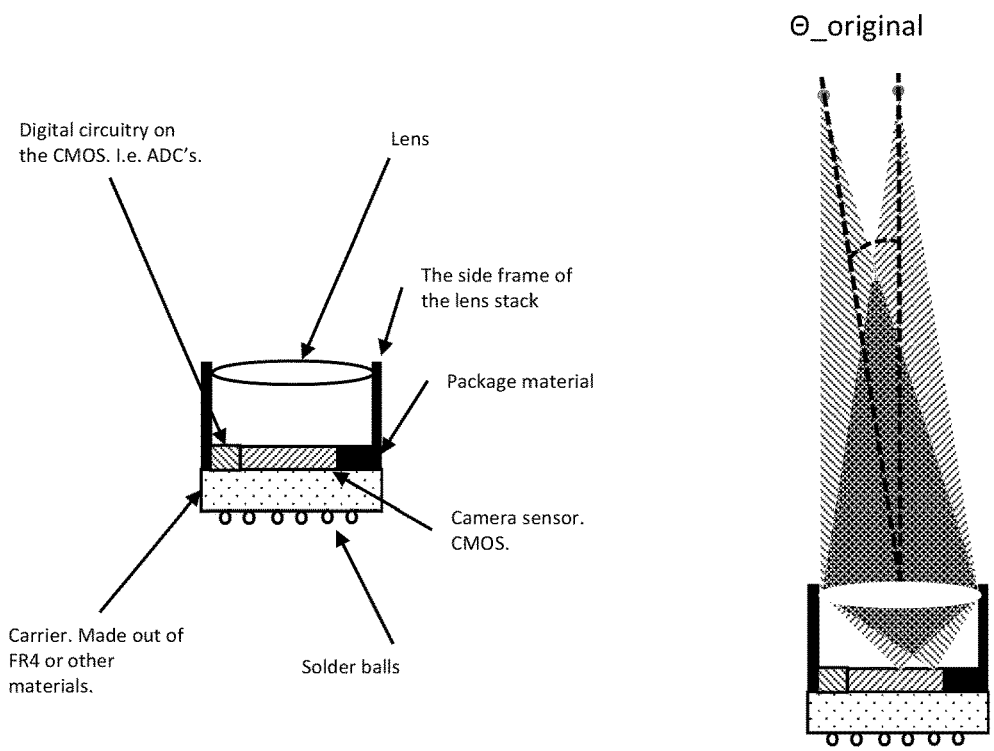
FIG. 6a shows an illustration of a standard camera.

FIG. 6a shows an illustration of a standard camera. On the left-hand side of FIG. 6a various components of the camera are labelled. On the right-hand side of FIG. 6a an angle $\Theta\_original$ is shown, which is the angle between the centre and edge points of the camera sensor.

Figure 6B:
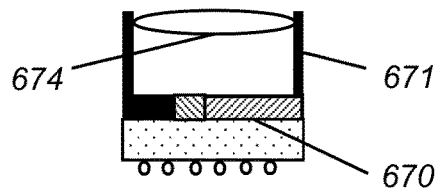
FIG. 6b shows an illustration of an example embodiment of a tilt-shift camera that can be embedded in the unitary part of FIG. 3 or FIG. 4.
Figure 6B:
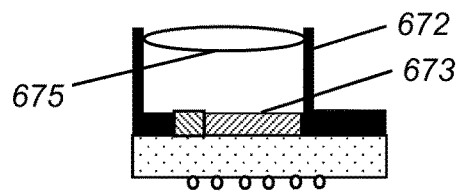
Figure 6B:
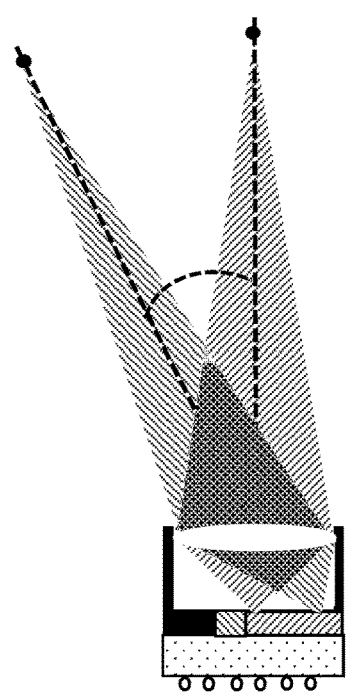

FIG. 6b shows an illustration of an example embodiment of a tilt-shift camera that can be embedded in the unitary part of FIG. 3 or FIG. 4. On the left-hand side of FIG. 6b, two implementations of the tilt-shift camera are shown: an upper implementation in which the camera sensor 670 is offset with respect to the side frame of the lens stack 671; and a lower implementation in which the side frame 672 of the lens stack is offset with respect to the camera sensor 673. In both implementations, the centre of the lens 674, 675 is laterally offset from the centre of the camera sensor 670, 673. On the right-hand side of FIG. 6b, it can be seen that the angle $\Theta\_offsetSensor$ between the centre and edge points of the camera sensor is greater for the tilt-shift camera of FIG. 6b than it is for the standard camera of FIG. 6a. That is, $\Theta\_offsetSensor > \Theta\_original$.

Therefore, use of the tilt-shift camera of FIG. 6b addresses the problems associated with the need for a user or robot to tilt and mount a camera that are described above. This is because the field of view cone of the tilt-shift camera (that is shown on the right-hand side of FIG. 6b) is directed at an angle towards the eye without needing to tilt the camera. This enables a plane mounting of the camera on the carrier film, thereby removing the previously described expensive steps of tilting and mounting the tilted camera.

The tilt-shift camera can be implemented as a wafer level camera with its lens offset from the centre of the sensor plane, with the purpose of moving the field of view towards the eye. It enables a flat mounting of the camera while at the same time seeing the eye at a very high angle from the user. To enable easy and precise stacking of the optics to the sensor base, the sensor can be offset in the bottom portion of the camera. I.e., the logic can be placed in the same silicon piece as the sensor with all logic on one side, and the sensor towards the other side. If the sensor is sufficiently offset, the optics can be fully centred on the capsule to simplify the manufacturing of the optics and the mounting. If further rotating of the field of view (FOV) is needed then the lens can be further offsetted, either during assembly when the lens is mounted on the sensor or during manufacturing of the lens.

To enable a higher shifted angle, the lens can be designed with a low chief ray angle. This means that either the optics should be further away from the sensor plane and/or the sensor plane should be very small (and the lens designed for such a small sensor size). This is to limit the vignetting (darkening of the corners of the FOV).

By making a camera with this tilt-shift lens and using it when moulding the camera into a lens, the camera can be plane mounted without obscuring the user's vision. Beneficially, this enables mass production of the glasses.

The eye tracking glasses can therefore include a wafer level camera and optics for eye-tracking, with the optics shifting the field of view towards the users' eyes. The camera sensor area can be placed towards one side of the silicon chip, while the other areas can be used for other usages such as an ADC (analog to digital converter), an image signal processor (ISP), and data buses. The optics can be placed offset from the centre of the sensor. The optical stack can be made offsetted, where the different elements are not placed coaxially with each other. The optics do not have to have a circular symmetry. The pixels may be of different size or placement to normalize the image to a fixed pixel density of the viewed object to handle the distortion caused by the lens. The optics may be a transmissive diffractive optical element.

The invention claimed is:

1. A pair of eye tracking glasses comprising:
   a first unitary component molded from a UV-cured material that comprises:
      a first lens region, through which a first eye of a user can look when they are wearing the glasses; and
      a first carrier region, which is integrally formed during molding at the periphery of the first lens region;
   a second unitary component molded from a UV-cured material, which is mechanically connected to the first unitary component, wherein the second unitary component comprises:
      a second lens region, through which a second eye of the user can look when they are wearing the glasses; and
      a second carrier region, which is integrally formed during molding at the periphery of the second lens region;
   wherein each of the first unitary component and the second unitary component has integrally embedded therein during the UV-curing and molding process:
      a camera embedded in the respective carrier region;
      a plurality of illuminators embedded in the respective lens region; and
      electrical conductors configured to provide power and signaling connectivity to the embedded components,
   wherein the electrical conductors include a transparent flexible printed circuit embedded in the respective lens region and electrically connected to the plurality of illuminators, and a periphery electrical conductor embedded in the respective carrier region and electrically connected to the camera and to the transparent flexible printed circuit;
   wherein the camera, the plurality of illuminators, and the electrical conductors of each unitary component are mounted on a carrier film that is also embedded in the respective unitary component during the UV-curing and molding process to ensure alignment of the embedded components;
   wherein the UV-cured material hermetically seals the embedded components to provide insulation;
   wherein the UV-curing and molding process is performed at temperatures that do not damage the embedded components to ensure functionality of the embedded components post-curing;
   wherein the pair of eye tracking glasses further comprises:
      a first arm that is mechanically connected to the first carrier region of the first unitary component;
      a second arm that is mechanically connected to the second carrier region of the second unitary component; and
      a control module that is configured to:
         receive signaling from the camera of each of the unitary components via the embedded electrical conductors; and
         provide signaling to the plurality of illuminators of each of the unitary components via the embedded electrical conductors.

2. The pair of eye tracking glasses of claim 1, wherein the first unitary component and the second unitary component are provided together as a single unitary part.

3. The pair of eye tracking glasses of claim 1, wherein at least some of the electrical conductors are in the carrier regions of the unitary components.

4. The pair of eye tracking glasses of claim 1, wherein:
   the first arm is mechanically connected directly to the first carrier region of the first unitary component by a first hinge;
   the second arm is mechanically connected directly to the second carrier region of the second unitary component by a second hinge.

5. The pair of eye tracking glasses of claim 4, wherein:
   the first carrier region of the first unitary component includes a first hinge mounting recess;
   the second carrier region of the second unitary component includes a second hinge mounting recess;
   the first hinge is provided in the first hinge mounting recess; and
   the second hinge is provided in the second hinge mounting recess.

6. The pair of eye tracking glasses of claim 1, wherein one or both of the first and second carrier regions of the unitary components further comprise an external camera mounting recesses for mounting an external camera.

7. The pair of eye tracking glasses of claim 1, wherein one or both of the carrier regions of the unitary components further comprise a microphone mounting recess for mounting a microphone.

8. The pair of eye tracking glasses of claim 1, further comprising a display embedded in each of the lens regions of the unitary components for providing augmented reality functionality.

9. The pair of eye tracking glasses of claim 1, further comprising:
  a holographic mirror embedded in each of the lens regions of the unitary components for providing augmented reality functionality; and
  a projector configured to project images onto the holographic mirror.

10. The pair of eye tracking glasses of claim 1, wherein:
  the lens regions of the unitary components comprise tunable liquid crystal lenses; and
  the control module is configured to:
    process images captured by the cameras integrally embedded during the UV-curing and molding process in the unitary components in order to determine a gaze direction of the user's eyes and/or a convergence distance; and
    tune the refractive index of different regions of the tunable liquid crystal lenses based on the determined gaze direction and/or the determined convergence distance.

11. The pair of eye tracking glasses of claim 1, wherein:
  one of the arms comprises:
    the control module located therein;
    an arm electrical connector; and
    an arm electrical conductor embedded integrally during the UV-curing and molding process therein, which provides an electrical connection between the control module and the arm electrical connector; and
  one of the unitary components comprises a unitary component electrical connector, which is: i) electrically connected to the unitary component electrical conductor that is integrally embedded during the UV-curing and molding process in the unitary component; and ii) electrically connected to the arm electrical connector; such that electrical signaling can be communicated between the control module and the camera and the plurality of illuminators that are integrally embedded during the UV-curing and molding process in the unitary component.

12. The pair of eye tracking glasses of claim 1, wherein the cameras integrally embedded during the UV-curing and molding process in the first and second unitary components are tilt-shift cameras.

* * * * *